(12) United States Patent
Ji

(10) Patent No.: US 12,417,414 B2
(45) Date of Patent: Sep. 16, 2025

(54) TRANSPORTATION SYSTEM AND OPERATION METHOD THEREOF

(71) Applicant: HYUNDAI MOBIS CO., LTD., Seoul (KR)

(72) Inventor: Yong Kwan Ji, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 76 days.

(21) Appl. No.: 17/474,512

(22) Filed: Sep. 14, 2021

(65) Prior Publication Data
US 2022/0114505 A1   Apr. 14, 2022

(30) Foreign Application Priority Data

Oct. 8, 2020   (KR) ........................ 10-2020-0130249

(51) Int. Cl.
| | | |
|---|---|---|
| *G06Q 10/02* | (2012.01) | |
| *E04H 6/00* | (2006.01) | |
| *G01C 21/34* | (2006.01) | |
| *G01C 21/36* | (2006.01) | |
| *G06Q 50/40* | (2024.01) | |

(52) U.S. Cl.
CPC ............. *G06Q 10/025* (2013.01); *E04H 6/00* (2013.01); *G01C 21/343* (2013.01); *G01C 21/3617* (2013.01); *G06Q 10/02* (2013.01); *G06Q 50/40* (2024.01)

(58) Field of Classification Search
CPC ............................... G06Q 50/30; G06Q 10/02
See application file for complete search history.

(56) References Cited

U.S. PATENT DOCUMENTS

| | | |
|---|---|---|
| 6,317,720 B1 | 11/2001 | Murakami et al. |
| 6,453,298 B2 | 9/2002 | Murakami et al. |
| 9,234,765 B1 * | 1/2016 | Padovitz ................ G01C 21/20 |
| 2007/0282520 A1 | 12/2007 | Cradick et al. |
| 2010/0299207 A1 | 11/2010 | Harley et al. |

(Continued)

FOREIGN PATENT DOCUMENTS

| | | |
|---|---|---|
| CN | 109326119 A | 2/2019 |
| CN | 111639854 B | 10/2023 |

(Continued)

OTHER PUBLICATIONS

Marnix Groot, "A History of the Boarding Bridge", Jul. 2, 2019, AirportHisotry.org (Year: 2019).*

(Continued)

*Primary Examiner* — Emmett K. Walsh
(74) *Attorney, Agent, or Firm* — NSIP Law

(57) ABSTRACT

A transportation system including a vehicle hub having a plurality of connection slots, each connection slot accommodating a plurality of vehicles such that the vehicle hub is connected to an interior space of each vehicle through the respective connection slot, the plurality of vehicles being categorized by travel theme, and the plurality of connection slots being grouped by category such that connection slots in a same group are disposed adjacent to each other; and a server to collect passenger information related to travel preferred by passengers, to match the passengers with the connection slots or the vehicles based on the passenger information, and to guide the passengers to the matched connection slots or vehicles.

15 Claims, 4 Drawing Sheets

(56) References Cited

U.S. PATENT DOCUMENTS

| | | | |
|---|---|---|---|
| 2011/0047000 A1 | 2/2011 | Perry | |
| 2011/0059693 A1 | 3/2011 | O'Sullivan | |
| 2011/0218834 A1* | 9/2011 | Boss | G06Q 10/06316 |
| | | | 701/532 |
| 2012/0251276 A1 | 10/2012 | Rathbun et al. | |
| 2012/0290185 A1 | 11/2012 | Cooper et al. | |
| 2015/0221225 A1 | 8/2015 | Petersen et al. | |
| 2016/0321925 A1* | 11/2016 | Al Suwaidi | G08G 1/0175 |
| 2016/0343068 A1 | 11/2016 | Barrois et al. | |
| 2017/0039667 A1 | 2/2017 | Kim | |
| 2018/0108103 A1 | 4/2018 | Li et al. | |
| 2018/0136655 A1* | 5/2018 | Kim | G05D 1/0088 |
| 2018/0222340 A1 | 8/2018 | Zhao et al. | |
| 2018/0357912 A1* | 12/2018 | Kessler | G08G 7/02 |
| 2018/0366004 A1 | 12/2018 | Laetz | |
| 2019/0108468 A1* | 4/2019 | Nguyen | G01C 21/3415 |
| 2019/0137290 A1 | 5/2019 | Levy et al. | |
| 2020/0098261 A1 | 3/2020 | O'Sullivan | |
| 2020/0217677 A1 | 7/2020 | Wang et al. | |
| 2020/0226498 A1 | 7/2020 | Jiwani et al. | |
| 2020/0249047 A1* | 8/2020 | Balva | G01C 21/3438 |
| 2020/0410375 A1 | 12/2020 | Seagraves et al. | |
| 2021/0166164 A1* | 6/2021 | Proctor | G06Q 10/0633 |
| 2021/0224943 A1 | 7/2021 | Yanai et al. | |
| 2021/0380022 A1 | 12/2021 | Kanitz | |
| 2022/0113149 A1 | 4/2022 | Ji | |
| 2022/0114505 A1 | 4/2022 | Ji | |
| 2022/0364866 A1 | 11/2022 | Williams et al. | |

FOREIGN PATENT DOCUMENTS

| | | |
|---|---|---|
| KR | 2000-0072090 A | 12/2000 |
| KR | 10-2016-0113675 A | 9/2016 |
| KR | 10-1724211 B1 | 4/2017 |
| KR | 10-2118290 B1 | 6/2020 |
| KR | 10-2020-0098002 A | 8/2020 |
| KR | 10-2020-0114825 A | 10/2020 |
| WO | WO 2018/087811 A1 | 5/2018 |

OTHER PUBLICATIONS

Lin, Youfang, et al. "Inferring the travel purposes of passenger groups for better understanding of passengers." IEEE Transactions on Intelligent Transportation Systems 16.1 (2014): 235-243. (Year: 2014).*

United States Office Action Issued on Dec. 30, 2022, in related United States U.S. Appl. No. 17/468,212 (36 Pages in English).

"Hyundai Motor Presents Smart Mobility Solution 'UAM-PBV-Hub' to Vitalize Future Cities", Hyundai Motor Company, issued on Jan. 7, 2020, (5 pages in English).

Extended European search report issued on Feb. 10, 2022, in counterpart European Patent Application No. 21196469.7 (8 pages in English).

Pechlaner, Harald et al., "Overtourism: Tourism Management and Solutions", Contemporary Geographies of Leisure, Tourism, and Mobility, 2020, (33 Pages in English).

United States Office Action Issued on Mar. 16, 2023, in U.S. Appl. No. 17/467,993 (29 Pages in English).

United States Office Action issued on Jun. 9, 2023, in related United States U.S. Appl. No. 17/467,993 (37 pages in English).

Chinese Office Action issued on May 31, 2024, in counterpart Chinese Patent Application No. 202111169410.5 (8 pages in English, 7 pages in Chinese).

U.S. Office Action issued on Feb. 1, 2024, in U.S. Appl. No. 17/467,993 (11 pages).

Chinese Office Action issued on Jun. 21, 2024, in counterpart Chinese Patent Application No. 202111165333.6 (19 pages in English, 16 pages in Chinese).

Chinese Office Action issued on Jun. 28, 2024, in counterpart Chinese Patent Application No. 202111172940.5 (11 pages in English, 11 pages in Chinese).

U.S. Notice of Allowance issued on Apr. 10, 2024, in related U.S. Appl. No. 17/467,993 (10 pages).

Korean Office Action issued on Jun. 23, 2025 in counterpart Korean Patent Application No. 10- 2020-0130249 (8 pages in Korean).

Korean Office Action issued on Jun. 23, 2025 in counterpart Korean Patent Application No. 10- 2020-0130248 (8 pages in Korean).

Korean Office Action issued on May 21, 2025 in counterpart Korean Patent Application No. 10- 2020-0130250 (6 pages in Korean).

* cited by examiner

200

100

TRANSPORTATION SYSTEM AND OPERATION METHOD THEREOF

CROSS-REFERENCE TO RELATED APPLICATION

This application claims the benefit of Korean Patent Application No. 10-2020-0130249, filed on Oct. 8, 2020 with the Korean Intellectual Property Office, the disclosure of which is herein incorporated by reference in its entirety.

BACKGROUND OF THE INVENTION

1. Field of the Invention

The present invention relates to a transportation system configured such that a plurality of vehicles having different travel themes is provided, the plurality of vehicles is parked in connection slots of a vehicle hub that functions as a complex terminal (e.g., a terminal complex), the vehicles are categorized by travel theme, the connection slots are grouped by category, the grouped collection slots are disposed adjacent to each other in the vehicle hub, passenger information is collected, a travel theme is selected based on the passenger information, and a vehicle for the travel theme is provided to a passenger and an operation method thereof.

2. Description of the Related Art

For a conventional vehicle, which is a transportation means, a driver directly drives in a driver's seat or a passenger sits in a passenger seat or back seats performing limited activities. With increasing development of autonomous driving technology, however, relative importance of people in vehicles has gradually decreased. In addition, development of an electric vehicle requiring no large internal combustion engine has been actively conducted. Conventionally, articles that may be provided in the vehicle excluding the seats are limited. Since a larger space is provided in an electric vehicle having the same size as a conventional vehicle, however, a passenger may perform a wider variety of activities in the vehicle.

Therefore, a concept of a purpose built vehicle in which the vehicle has a specific purpose and is provided with articles for the purpose, and development of various operation systems capable of providing various travel or cultural content to a passenger using the purpose built vehicle is required.

The matters disclosed in this section are merely for enhancement of understanding of the general background of the invention and should not be taken as an acknowledgment or any form of suggestion that the matters form the related art already known to a person skilled in the art.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a transportation system includes: a vehicle hub including a plurality of connection slots, each connection slot being configured to accommodate a plurality of vehicles such that the vehicle hub is connected to an interior space of each vehicle through the respective connection slot, the plurality of vehicles being categorized by travel theme, and the plurality of connection slots being grouped by category such that connection slots in a same group are disposed adjacent to each other; and a server configured to collect passenger information related to travel preferred by passengers, to match the passengers with the connection slots or the vehicles based on the passenger information, and to guide the passengers to the matched connection slots or vehicles.

The server may be configured to request consent for collection of the passenger information upon receiving a request for a vehicle from a terminal (i.e., a mobile terminal such as a smart phone, etc.) of each passenger, and to collect the passenger information from the terminal of the passenger in a case in which the consent for collection of passenger information is obtained from the terminal of the passenger.

The passenger information may include retrieval information of the terminal of the respective passenger, location information, health information, picture information, or purchase information, and the server may be configured to select the travel theme of a vehicle to be matched with the passenger based on the retrieval information of the terminal of the respective passenger, the location information, the health information, the picture information, or the purchase information.

The server may be configured to set a movement route of each vehicle based on the travel theme of the respective vehicle matched with the passenger, and perform control such that the vehicle moves along the set movement route after boarding of the passenger.

The server may be configured to determine transit points or destinations to which the vehicles will move based on the travel themes of the vehicles matched with the passengers, notify the passengers of the determined transit points or destinations, and guide passengers heading toward an identical transit point or destination to board an identical vehicle.

In a case in which the plurality of passengers in the vehicle arrives at the transit point, the server may be configured to guide the plurality of passengers to transfer to vehicles for different destinations.

Upon receiving a request for changing a transit point or a destination from a terminal of any one of the passengers, the server may be configured to match the passenger with a connection slot or a vehicle for the changed transit point or destination and guide the passenger to the matched connection slot or vehicle before departure of the vehicle, and guide the passenger to transfer to a vehicle for the changed transit point or destination after departure of the vehicle.

Categories for the travel theme may include an event, an area, or nature.

The server may be configured to set a movement route of a vehicle classified into the event category, among the plurality of vehicles, based on event information comprising a local event, a cultural event, or a film festival.

The server may be configured to set a movement route of a vehicle classified into the area category, among the plurality of vehicles, based on area information comprising a popular restaurant, a specialty, or a place.

The server may be configured to set a movement route of a vehicle classified into the nature category, among the plurality of vehicles, based on nature information comprising weather, a mountain, a river, a lake, or a sea.

The plurality of vehicles may provide information about the travel themes to the passengers during movement, and the vehicles may be provided with articles necessary to provide the information about the travel themes.

In another general aspect, an operation method of a transportation system, which includes a vehicle hub having a plurality of connection slots, each connection slot being configured to accommodate a plurality of vehicles such that the vehicle hub is connected to an interior space of each vehicle through the respective connection slot, includes: categorizing the plurality of vehicles by travel theme; grouping the plurality of connection slots by category; allocating the connection slots to the vehicle hub such that connection slots in a same group disposed adjacent to each other; collecting passenger information related to travel preferred by passengers and matching the passengers with the connection slots or the vehicles based on the passenger information; and guiding the passengers to the matched connection slots or vehicles.

The operation method may include determining transit points or destinations to which the vehicles will move based on the travel themes of the vehicles matched with the passengers, notifying the passengers of the determined transit points or destinations, and guiding a plurality of passengers heading toward an identical transit point or destination to board an identical vehicle after the guiding the passengers to the matched connection slots or vehicles.

The operation method may include, in a case in which the plurality of passengers in the vehicle arrives at the transit point, guiding the plurality of passengers to transfer to vehicles for different destinations after the guiding the plurality of passengers heading toward the identical transit point or destination to board the identical vehicle.

Other features and aspects will be apparent from the following detailed description, the drawings, and the claims.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
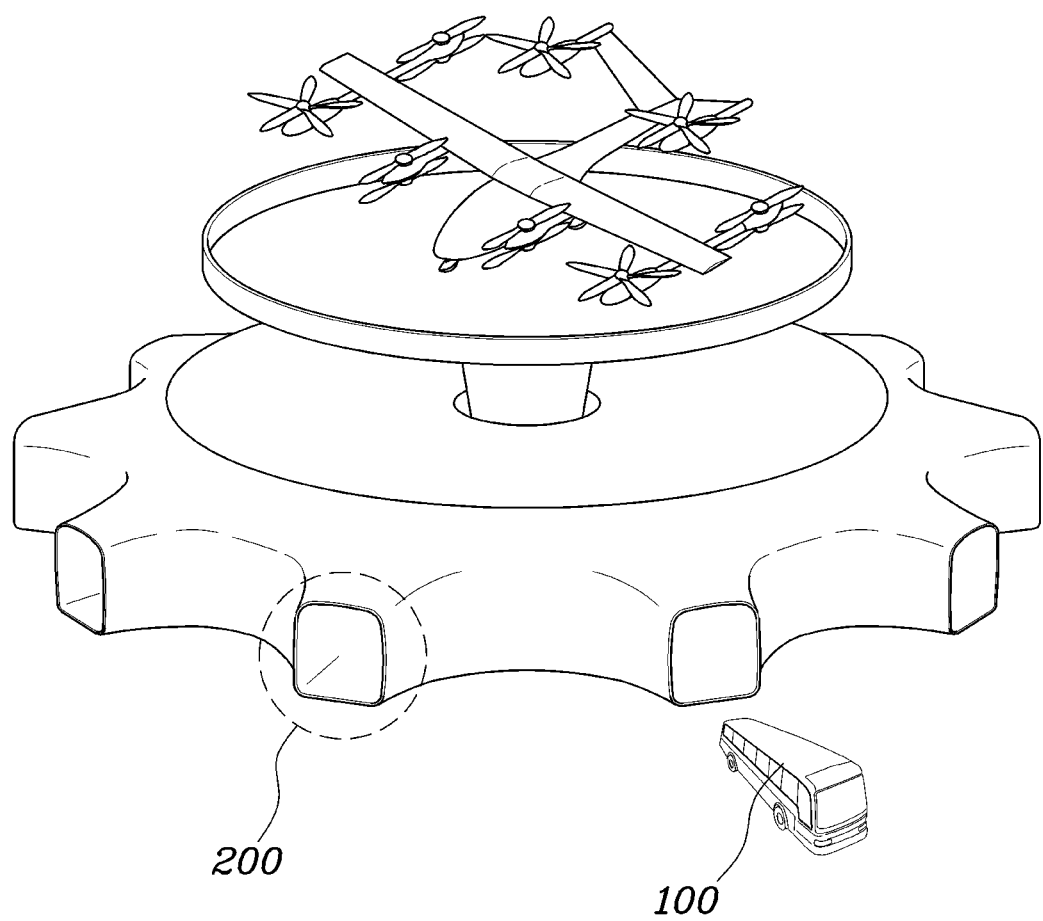
FIG. 1 is a view showing vehicles and connection slots in a vehicle hub of a transportation system according to an embodiment of the present invention.
Figure 2:
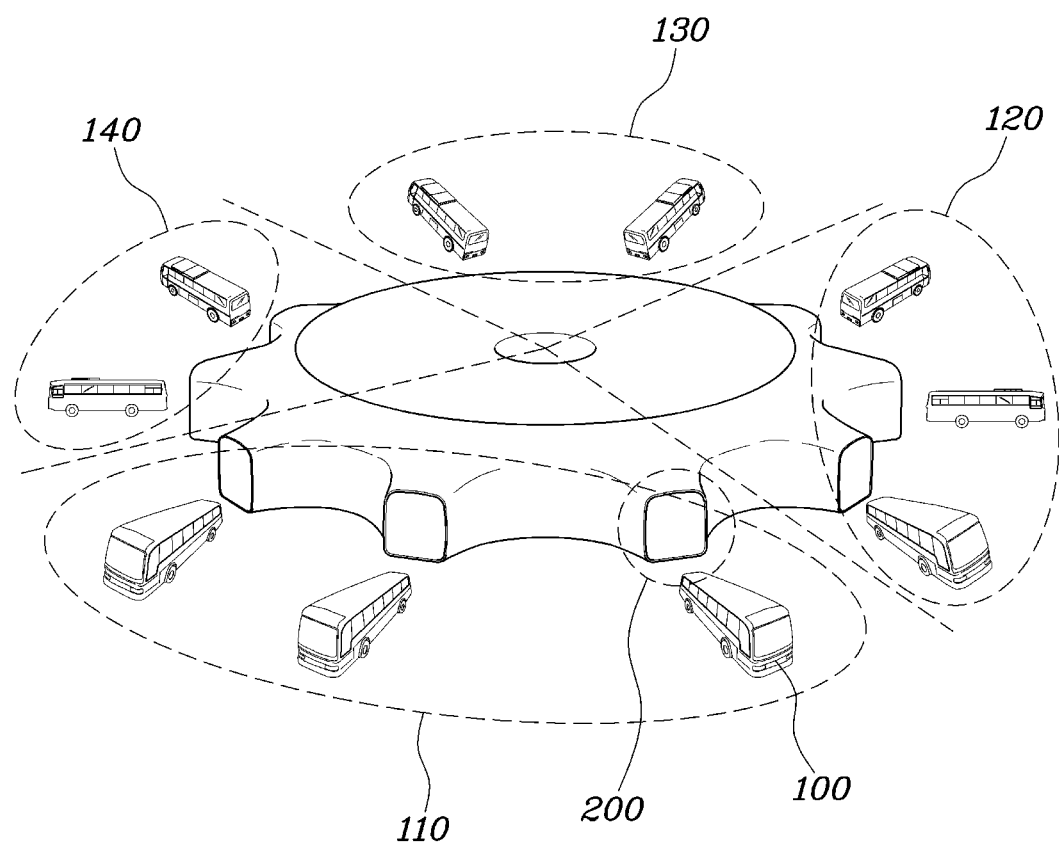
FIG. 2 is a view showing that a plurality of vehicles is categorized into grouped connection slots by travel theme in the vehicle hub of the transportation system according to the embodiment of the present invention.
Figure 3:
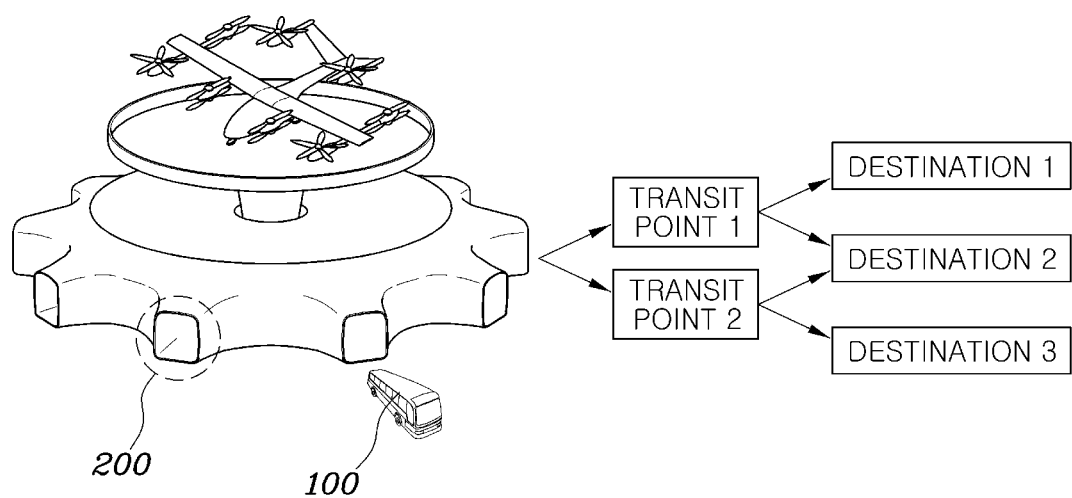
FIG. 3 is a view showing that a plurality of passengers moves to transit points in order to transfer to vehicles for different destinations in the transportation system according to the embodiment of the present invention.
Figure 4:
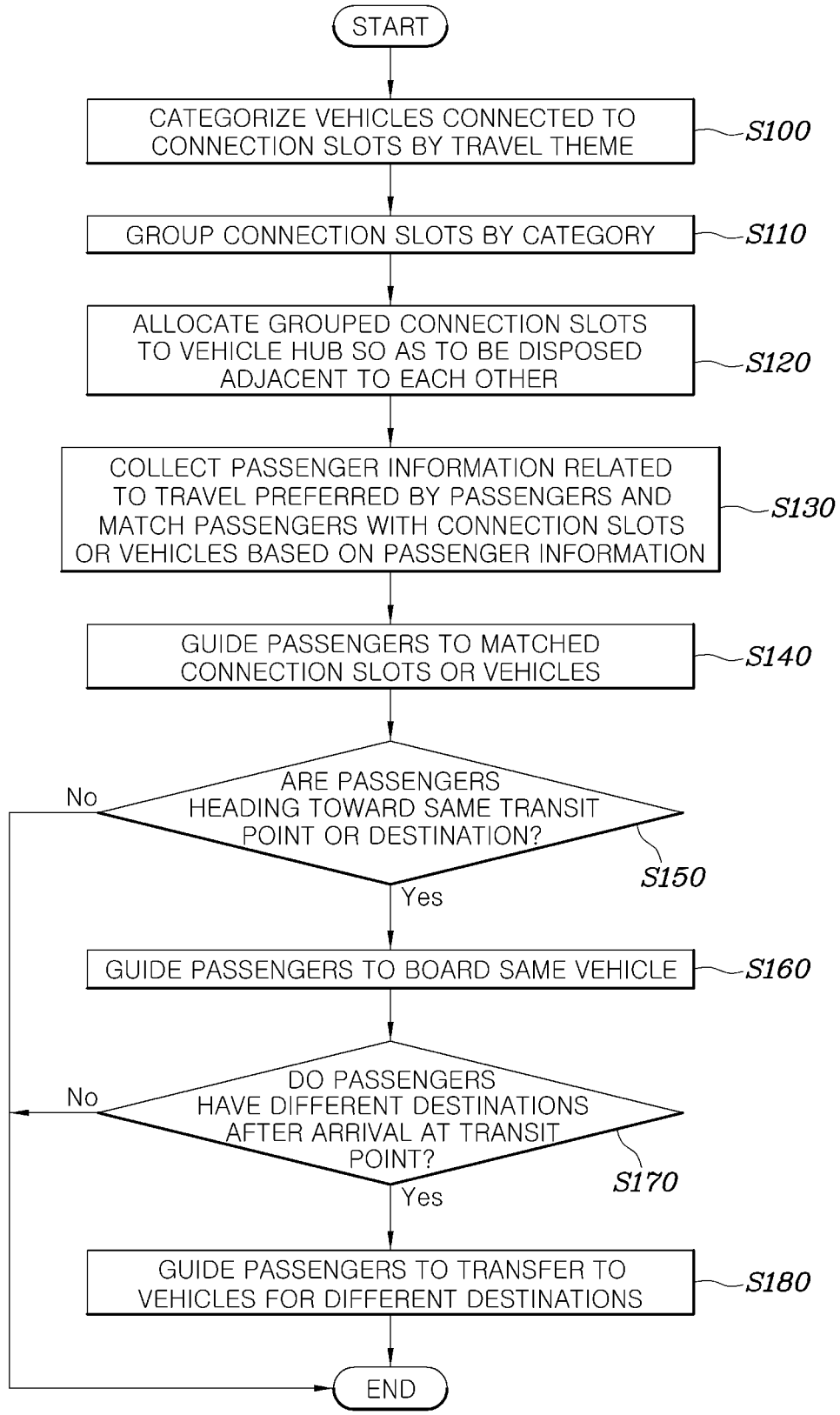
FIG. 4 is a flowchart showing an operation method of the transportation system according to the embodiment of the present invention.

FIG. 1 is a view showing vehicles and connection slots in a vehicle hub of a transportation system according to an embodiment of the present invention. FIG. 2 is a view showing that a plurality of vehicles is categorized into grouped connection slots by travel theme in the vehicle hub of the transportation system according to the embodiment of the present invention. FIG. 3 is a view showing that a plurality of passengers moves to transit points in order to transfer to vehicles for different destinations in the transportation system according to the embodiment of the present invention. FIG. 4 is a flowchart showing an operation method of the transportation system according to the embodiment of the present invention.

FIG. 1 is a view showing vehicles and connection slots in a vehicle hub of a transportation system according to an embodiment of the present invention. FIG. 2 is a view showing that a plurality of vehicles is categorized into grouped connection slots by travel theme in the vehicle hub of the transportation system according to the embodiment of the present invention. The transportation system according to the embodiment of the present invention includes a vehicle hub, configured such that a plurality of connection slots 200 is formed, in the case in which a plurality of vehicles 100 is parked respectively in the connection slots 200, the vehicle hub is connected to interior spaces of the vehicles 100 through the connection slots 200, the plurality of vehicles 100 connected to the respective connection slots 200 is categorized by travel theme, the plurality of connection slots 200 is grouped (110, 120, 130, and 140) by category, and the grouped connection slots 200 are disposed adjacent to each other, and a server, configured to collect passenger information related to travel preferred by passengers, to match the passengers with the connection slots 200 or the vehicles 100 based on the passenger information, and to guide the passengers to the matched connection slots or vehicles. Such a server inherently includes at least one processor (e.g., a server processor) and related elements (e.g., memory).

In the case in which autonomous vehicles are commercialized from now on, passengers may not directly drive the vehicles 100, and may perform various activities in the vehicles 100 for specific purposes while the vehicles 100 move to predetermined destinations. In order for the passengers to perform various activities in the vehicles 100 for specific purposes, therefore, the vehicle hub may perform control such that the vehicles 100 are provided with articles necessary for various activities and such that the vehicles 100 are disposed in the connection slots 200 in the vehicle hub depending on demand or preference of the passengers. The vehicle hub is a complex terminal. Passengers may board the vehicles 100 in the vehicle hub, or may also use the vehicle hub as transfer passages. In the case in which connection slots 200 grouped by category are disposed adjacent to each other, therefore, passengers belonging to the same categories may more easily and rapidly move to and board the vehicles.

Meanwhile, in the transportation system according to the embodiment of the present invention, upon receiving a request for a necessary vehicle 100 from a passenger, the server may allow the passenger to directly select the travel theme of a vehicle 100 to be provided, or may analyze the tendency or preference of the passenger to select the travel theme of the vehicle. The server may park the vehicle 100 in the connection slots 200 grouped by category, and may guide the passenger to the matched vehicle 100 or connection slot 200. The passenger may board the provided vehicle 100 to move to a transit point or a destination. During movement, the passenger may perform various activities by travel theme in the vehicle.

Also, in the transportation system according to the embodiment of the present invention, the server may request consent for collection of passenger information upon receiving a request for a vehicle from a terminal of the passenger. In the case in which consent for collection of passenger information is obtained, the server may collect the passenger information from the terminal of the passenger. In the transportation system according to the embodiment of the present invention, the passenger information may include retrieval information of the terminal of the passenger, location information, health information, picture information, or purchase information, and the server may select the travel theme of a vehicle to be matched with the passenger based on the retrieval information of the terminal of the passenger, the location information, the health information, the picture information, or the purchase information.

Specifically, in the case in which the passenger consents to provision of personal information, the server collects retrieval, picture, or location information of an electronic device, such as a personal mobile phone or a desktop computer, receives health information of the passenger, or collects reservation information, such as public performances, movies, personal articles, hotels, resorts, and lodging. In addition, the server collects travel information by area, such as features, food, location, seasons, weather, weather forecast, natural disasters, various things to see, events, popular restaurants, tourist spots, and cultural events, in relation to the travel theme. The server analyzes or classifies the tendency or preference of the passenger and contents, a transit point, and a destination related to the travel theme using a big data analysis-based technique (AI) based on the passenger information and the travel information in order to sort vehicle hub zones or to select the category of the vehicle 100.

FIG. 3 is a view showing that a plurality of passengers moves to transit points in order to transfer to vehicles for different destinations in the transportation system according to the embodiment of the present invention. In the transportation system according to the embodiment of the present invention, the server may set a movement route of the vehicle 100 based on the travel theme of the vehicle 100 matched with the passenger, and may perform control such that the vehicle 100 moves along the set movement route after boarding of the passenger. For example, in the case in which the passenger must urgently move, the transportation means must move via a specific place, or a time for the passenger to perform various activities in the vehicle 100 based on the travel theme of the vehicle 100 is necessary, the server may calculate a necessary time, may set the movement route of the vehicle 100 based thereon, and may perform control such that the vehicle 100 moves along the set movement route. During movement of the vehicle 100, therefore, the passenger may perform various activities, such as rest, eating, movie watching, education related to the travel theme (tourist resorts or historic sites), and a small-scale event, in the vehicle 100.

Also, in the transportation system according to the embodiment of the present invention, the server may determine a transit point or a destination to which the vehicle 100 will move based on the travel theme of the vehicle 100 matched with the passenger, and may notifying the passenger of the determined transit point or destination. In addition, the server may guide a plurality of passengers heading toward the same transit point or destination to board the same vehicle 100. For example, referring to FIG. 3, a vehicle 100 for destination 1 or destination 2 via transit point 1 and a vehicle 100 for destination 2 or destination 3 via transit point 2 may be allocated to the vehicle hub. In the case in which the server guides passengers having the same travel theme and heading toward the same transit point and the same destination to board the same vehicle 100, this is very efficient in movement and setting of a travel route.

Meanwhile, in the transportation system according to the embodiment of the present invention, in the case in which a plurality of passengers in a vehicle 100 arrives at a transit point, the server may guide the plurality of passengers to transfer to vehicles 100 for different destinations. The server may guide passengers having the same travel theme and heading toward the same transit point to board the same vehicle 100. In the case in which travel themes or destinations preferred by the passengers are different from each other after arrival at the transit point, the server may previously allocate vehicles 100 for the respective destinations to the transit point at which the passengers have arrived depending on the travel themes or destinations preferred by the passengers such that the passengers can transfer to the vehicles 100.

Also, in the transportation system according to the embodiment of the present invention, upon receiving a request for changing a transit point or a destination from a terminal of any one of the passengers, the server may match the passenger with a connection slot 200 or a vehicle 100 for the changed transit point or destination and may guide the passenger to the matched connection slot 200 or vehicle 100 before departure of the vehicle 100, and may guide the passenger to transfer to a vehicle 100 for the changed transit point or destination after departure of the vehicle 100.

In the case in which passengers are guided to vehicles for transit points and destinations depending on the transit points and destinations, as described above, it is possible to efficiently set a route by travel theme in group travel or package travel as well as private travel. In the case in which several people have the same travel theme and the same transit point or the same destination, they may be matched with each other as travel mates who travel together or perform various activities, such as rest, eating, movie watching, education related to the travel theme (tourist resorts or historic sites), and a small-scale event, together in the vehicle on the travel route.

Meanwhile, in the transportation system according to the embodiment of the present invention, in the case in which a plurality of vehicles 100 is categorized by travel theme, the category may include an event, an area, or nature. Also, in the transportation system according to the embodiment of the present invention, the plurality of vehicles 100 may provide information about the travel themes to the passengers during movement, and the vehicles 100 may be provided with articles necessary to provide the information about the travel themes.

Demand for the vehicles 100 disposed in the vehicle hub changes depending on the travel themes, the transit points, or the destinations thereof based on tendency or preference of passengers. When there is a request for boarding of passengers, therefore, the vehicle hub predicts demand for vehicles 100 belonging to the travel theme based on tendency or preference of passengers, and performs control such that the vehicles 100 wait in the connection slots 200. In the case in which demand is higher or lower than predicted, articles provided in each vehicle 100 are replaced, whereby the travel theme or category of the vehicles 100 is changed, and therefore the demands of passengers are satisfied. The category by travel theme may be mainly classified as an event, an area, or nature, and the vehicles 100 may be replaceably provided with articles necessary to perform various activities, such as rest, eating, movie watching, education related to the travel theme (tourist resorts or historic sites), and a small-scale event, in the vehicles 100.

Specifically, in the transportation system according to the embodiment of the present invention, the server may set a movement route of a vehicle 100 classified into the event category, among the plurality of vehicles, based on event information including a local event, a cultural event, or a film festival. In this case, the server may set a local event venue, a cultural event venue, a film festival place, and various other festival places as transit points or destinations of the vehicle 100 such that the passengers can experience the local event, the cultural event, the film festival, and various other festivals at the places.

Also, in the transportation system according to the embodiment of the present invention, the server may set a movement route of a vehicle 100 classified into the area category, among the plurality of vehicles, based on area information including popular restaurants, specialties, or places. In this case, the server may set specialty stores, popular restaurants, traditional experience centers, and historic sites in various areas as transit points or destinations of the vehicle 100 such that the passengers can purchase the specialties, eat food in the popular restaurants, experience traditional culture, and see historic sites at the places.

Meanwhile, in the transportation system according to the embodiment of the present invention, the server may set a movement route of a vehicle 100 classified into the nature category, among the plurality of vehicles, based on nature information including weather, mountains, rivers, lakes, or seas. In this case, the server may set mountains, rivers, lakes, and seas in various areas as transit points or destinations of the vehicle 100 such that the passengers can climb mountains or perform various activities, such as fishing, water leisure, and sightseeing, in the rivers, the lakes, or the seas.

In addition, the server may set places for various plays, religious pilgrimage, rest, and food depending on the travel themes as transit points or destinations of the vehicles 100 such that the passengers can perform various activities at transit points or destinations preferred by the passengers. Furthermore, articles provided in each vehicle 100 by travel theme are changed depending on the tendency or preference of the passenger, whereby the server may perform control such that the passenger can perform various activities using the articles provided in the vehicle 100.

Meanwhile, in the transportation system according to the embodiment of the present invention, the vehicle hub may be provided with a waiting area at which passengers wait before boarding the vehicles 100. In the grouped connection slots 110, 120, 130, and 140, vehicles 100 for transit points or destinations close to the vehicle hub or vehicles 100 having popular travel themes may be disposed close to the waiting area. In this case, passengers heading toward the transit points or destinations close to the vehicle hub are rapidly forwarded, whereby circulation of vehicles between vehicle hubs is rapidly performed, or the vehicles 100 having popular travel themes may be forwarded as rapidly as possible, whereby passenger convenience is improved and congestion in the vehicle hub is prevented.

FIG. 4 is a flowchart showing an operation method of the transportation system according to the embodiment of the present invention. The operation method of the transportation system according to the embodiment of the present invention includes a step (S100) of categorizing a plurality of vehicles connected respectively to a plurality of connection slots by travel theme, a step (S110) of grouping the plurality of connection slots by category, a step (S120) of allocating the grouped connection slots to a vehicle hub so as to be disposed adjacent to each other, a step (S130) of collecting passenger information related to travel preferred by passengers and matching the passengers with the connection slots or the vehicles based on the passenger information, and a step (S140) of guiding the passengers to the matched connection slots or vehicles.

The operation method of the transportation system according to the embodiment of the present invention may further include steps (S150 and 160) of determining transit points or destinations to which the vehicles will move based on travel themes of the vehicles matched with the passengers, notifying the passengers of the determined transit points or destinations, and guiding a plurality of passengers heading toward the same transit point or destination to board the same vehicle 100 after the step (S140) of guiding the passengers to the matched connection slots or vehicles.

The operation method of the transportation system according to the embodiment of the present invention may further include steps (S170 and 180) of, in the case in which the plurality of passengers in the vehicle arrives at the transit point, guiding the plurality of passengers to transfer to vehicles for different destinations after the steps (S150 and 160) of guiding a plurality of passengers heading toward the same transit point or destination to board the same vehicle.

In the transportation system according to the embodiment of the present invention, connection slots 200, in which vehicles 100 are parked, are grouped by travel theme or category, whereby it is possible for passengers to easily and rapidly board the vehicles 100 and to perform various activities based on the travel theme or category of the vehicles 100 in the vehicles 100. In addition, a server analyzes tendency or preference of the passengers to allocate the vehicles 100 to the connection slots 200, and controls allocation thereof, whereby it is possible for the passengers to efficiently use the vehicles 100 and a vehicle hub.

As is apparent from the above description, in a transportation system according to the present invention and an operation method thereof, a plurality of vehicles having different travel themes is provided, the plurality of vehicles is parked in connection slots of a vehicle hub that functions as a complex terminal, the vehicles are categorized by travel theme, the connection slots are grouped by category, the grouped collection slots are disposed adjacent to each other in the vehicle hub, and a server controls a movement route of each vehicle and guides passengers to vehicles having travel themes preferred by the passengers.

Although the preferred embodiments of the present invention have been described above with reference to the accompanying drawings, those skilled in the art will appreciate that the present invention can be implemented in various other embodiments without changing the technical ideas or features thereof.

What is claimed is:
1. A transportation system comprising:
a vehicle hub configured as a terminal complex comprising a plurality of connection slots, each of the connection slots configured to accommodate a vehicle among a plurality of vehicles such that the vehicle hub is connectable to the vehicles; and
a server including a processor,
wherein the processor is configured to:
collect passenger information and create travel themes based on preferences of passengers;
categorize each of the vehicles according to a corresponding travel theme from among the travel themes;
group each of the connection slots in the vehicle hub according to the corresponding travel theme such that the connection slots in a same group are disposed to be adjacent to each other;
match the passengers with the connection slots and the vehicles based on the passenger information related to the travel themes preferred by the passengers;

predict, using a big data analysis-based technique, demand for the vehicles according to the travel themes based on the preferences of the passengers;

control the matched vehicles to dock at the matched slots of the vehicle hub;

provide instructions to guide the passengers to the matched connection slots of the vehicle hub to be transported by the matched vehicles;

collect travel information by area, including features, food, location, seasons, weather, weather forecast, natural disasters, various things to see, events, popular restaurants, tourist spots, and cultural events, in relation to the travel theme; and classify the preference of the passenger, a transit point, and a destination related to the travel theme using the big data analysis-based technique (AI) based on the passenger information and the travel information in order to sort vehicle hub zones or to select the category of the vehicle.

2. The transportation system according to claim 1, wherein the processor is further configured to:

request consent for collection of the passenger information upon receiving a request for a vehicle from a mobile terminal of each of the passengers; and collect the passenger information from the mobile terminal of each of the passengers in response to the consent for collection of passenger information being obtained from the mobile terminal of the passenger.

3. The transportation system according to claim 2, wherein the passenger information comprises at least one of retrieval information of the mobile terminal of the respective passenger, location information, health information, picture information, or purchase information, and wherein the processor is further configured to determine the travel theme of a vehicle to be matched with the passenger based on at least one of the retrieval information of the mobile terminal of the respective passenger, the location information, the health information, the picture information, or the purchase information.

4. The transportation system according to claim 1, wherein the processor is further configured to:

determine a movement route of each of the vehicles based on the travel theme of the respective vehicle matched with the passenger; and control the vehicle to move along a set movement route after a boarding of the passenger.

5. The transportation system according to claim 4, wherein the processor is further configured to:

determine transit points or destinations to which the vehicles will move based on the travel themes of the vehicles matched with the passengers;

notify the passengers of the determined transit points or destinations; and provide instructions to guide the passengers heading toward an identical transit point or destination to board an identical vehicle.

6. The transportation system according to claim 5, wherein, in response to the plurality of passengers in the vehicle arriving at the transit point, the processor is further configured to guide the plurality of passengers to transfer to the vehicles for different destinations.

7. The transportation system according to claim 5, wherein, in response to receiving a request to change a transit point or a destination from a mobile terminal of any one of the passengers, the processor is further configured to:

match the passenger with the connection slot or the vehicle corresponding to the changed transit point or destination and guide the passenger to the matched connection slot or vehicle before departure of the vehicle; and provide instructions to guide the passenger to transfer to the vehicle corresponding to the changed transit point or destination after departure of the vehicle.

8. The transportation system according to claim 1, wherein categories for the travel themes include an event, an area, or nature.

9. The transportation system according to claim 8, wherein the processor is further configured to determine a movement route of a vehicle classified into the event category, among the plurality of vehicles, based on event information comprising at least one of a local event, a cultural event, or a film festival.

10. The transportation system according to claim 8, wherein the processor is further configured to determine a movement route of a vehicle classified into the area category, among the plurality of vehicles, based on area information comprising at least one of a popular restaurant, a specialty, or a place.

11. The transportation system according to claim 8, wherein the processor is further configured to determine a movement route of a vehicle classified into the nature category, among the plurality of vehicles, based on nature information comprising at least one of weather, a mountain, a river, a lake, or a sea.

12. The transportation system according to claim 8, wherein the plurality of vehicles provides information about the travel themes to the passengers during movement, and wherein the vehicles are provided with articles corresponding to the travel themes.

13. A processor implemented operation method of a transportation system including a vehicle hub configured as a terminal complex including a plurality of connection slots, each of the connection slots configured to accommodate a vehicle among a plurality of vehicles such that the vehicle hub is connectable to the vehicles, the method comprising:

collecting passenger information and creating travel themes based on preferences of passengers;

categorizing each vehicle among a plurality of vehicles according to a corresponding travel theme from among the travel themes;

grouping each of the connection slots in the vehicle hub according to the corresponding travel theme such that the connection slots in a same group are disposed to be adjacent to each other;

matching the passengers with the connection slots and the vehicles based on the passenger information related to the travel themes preferred by the passengers;

predicting, using a big data analysis-based technique, demand for the vehicles according to the travel themes based on the preferences of the passengers;

controlling the matched vehicles to dock at the matched slots of the vehicle hub;

providing instructions to guide the passengers to the matched connection slots of the vehicle hub to be transported by the matched vehicles;

collecting travel information by area, including features, food, location, seasons, weather, weather forecast, natural disasters, various things to see, events, popular restaurants, tourist spots, and cultural events, in relation to the travel theme; and classifying the preference of the passenger, a transit point, and a destination related to the travel theme using the big data analysis-based technique (AI) based on the passenger information and the travel information in order to sort vehicle hub zones or to select the category of the vehicle.

14. The method according to claim 13, further comprising:
   determining transit points or destinations to which the vehicles will move based on the travel themes of the vehicles matched with the passengers;
   notifying the passengers of the determined transit points or destinations; and
   guiding a plurality of passengers heading toward an identical transit point or destination to board an identical vehicle after the guiding of the passengers to the matched connection slots or vehicles.

15. The method according to claim 14, further comprising:
   in response to the passengers in the vehicle arriving at the transit point, guiding the plurality of passengers to transfer to vehicles corresponding to different destinations after guiding the plurality of passengers heading toward the identical transit point or destination to board the identical vehicle.

\* \* \* \* \*